United States Patent [19]

Zierhut

[11] Patent Number: 5,019,730
[45] Date of Patent: May 28, 1991

[54] INFORMATION SEPARATION DEVICE

[75] Inventor: Hermann Zierhut, Munich, Fed. Rep. of Germany

[73] Assignee: Siemens Aktiengesellschaft, Berlin & Munich, Fed. Rep. of Germany

[21] Appl. No.: 464,925

[22] Filed: Jan. 16, 1990

[30] Foreign Application Priority Data

Jan. 27, 1989 [EP] European Pat. Off. ........ 89101452.4

[51] Int. Cl.[5] .............................................. H03K 5/00
[52] U.S. Cl. ..................... 307/510; 307/520; 178/49; 375/36; 379/385
[58] Field of Search ............... 307/255, 572, 573, 576, 307/577, 128, 239, 520, 510, 518; 379/98, 385, 386; 340/310 R; 178/49; 375/36

[56] References Cited

U.S. PATENT DOCUMENTS 3,651,271 3/1972 Knauer ................................. 379/385
4,110,636 8/1978 Diskmans ............................ 307/255
4,451,703 5/1984 Brightman et al. .................. 379/385

Primary Examiner—John Zazworsky
Attorney, Agent, or Firm—Kenyon & Kenyon

[57] ABSTRACT

An information separation device having a transformer operating as a separating filter to separate transmitted direct current power and alternating voltage information. The transformer has at least two windings on a first side holding power in reserve. Between these windings a capacitor is serially coupled that transmits information signals. The windings are coupled at their other ends to transmission lines for direct current power and alternating voltage information. The transformer has another winding on the second side that processes received information. Two controllable inverse valves are coupled by their output electrodes between the transmission lines. The control electrodes of the valves are coupled to a load-independent voltage source during a transmission signal.

6 Claims, 1 Drawing Sheet

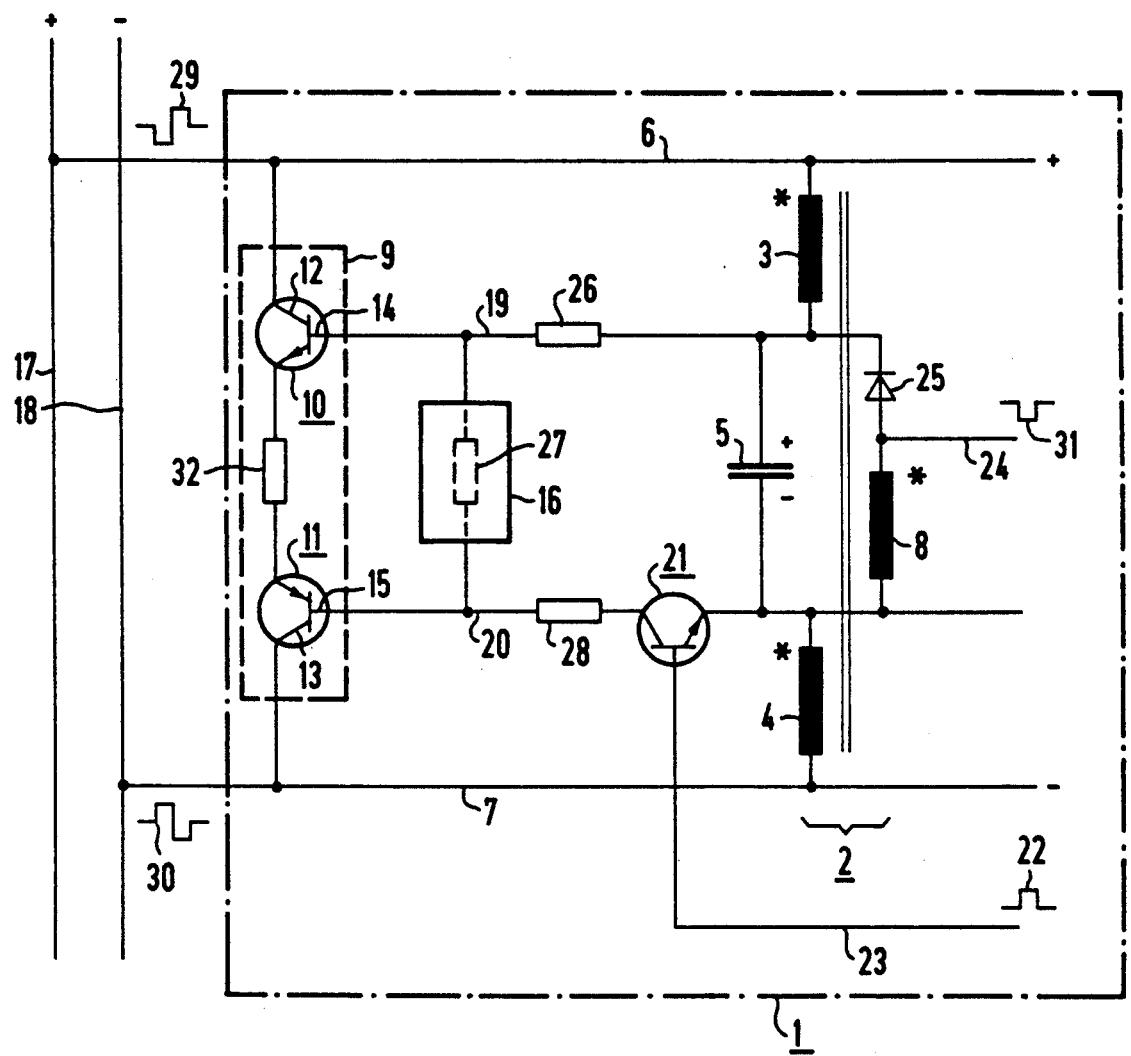
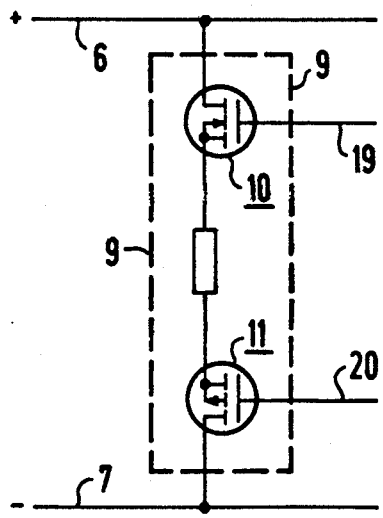
FIG 1
FIG 2

INFORMATION SEPARATION DEVICE

FIELD OF THE INVENTION

The present invention relates to an information separation device that, has a transformer functioning as a filter separating transmitted a.c. voltage information bearing signals from direct current power. Such a device is used as a bus-coupler for information processing devices that are coupled to data transmission lines which also supply direct current power. The data transmission lines carry a.c. voltage information bearing signals as a ripple voltage on the dc power on the input side of the information separation device.

BACKGROUND OF THE INVENTION

There are known systems that have stations which can either process data or operate sensors, wiring accessories or motor-driven equipment, like venetian blinds. These stations are coupled to a bus via a bus-coupler. The systems are designed either in a centralized or decentralized manner. Either digital data or analog signals can be transmitted over the bus for measuring or controlling the stations. In addition to the information, i.e. messages, sent to the stations, the system power for the electrical apparatus is also supplied via the bus-coupler. Bus systems of this type are also suitable for voice transmission, as is discussed in European Patent Application EP 88117678.8.

In such a system it is necessary to separate the information sent over the bus from the power for the electrical apparatus. To do this, there is a need for an information separation device that operates especially economically.

SUMMARY OF THE INVENTION

This and other needs are met by the present invention which provides an information separation device having a transformer that acts as a filter separating transmitted a.c. voltage information bearing signals from direct current power which is supplied on the same lines. The transformer has at least two windings on a first side which is the direct current power supply side. Between these windings a capacitor is serially arranged and blocks direct current flow. The windings are coupled at their other ends to the transmission lines carrying the direct current power and the a.c. voltage information bearing signals as a ripple on the direct current voltage.

The capacitor blocks the direct current power but transmits the information bearing signals, i.e., it acts as a conductor for the information bearing signals thereby separating the information bearing signals from the dc power. The transformer has one winding on a second side, which receives the information signal, and is of simple design due to the relatively low power demand. Controllable switches of opposite polarity having output electrodes are coupled between the transmission lines. For example, two transistors are coupled in a push-pull circuit. Control electrodes of the controllable switches of opposite polarity are coupled to a load-independent voltage source when transmitting, i.e., in addition to separating received signals, the device of the present invention can also transmit signals by outputting an a.c. voltage signal on the direct current power lines. Another switch, controlled by the transmission voltage and placed in at least one of two lines connecting the load-independent voltage source to the capacitor is enabled to control the coupling of the switches in the push-pull circuit to the load independent voltage source.

In the illustrated embodiment of the invention, the controllable switches of opposite polarity in the push-pull circuit are thus arranged between the transformer and the connections for the transmission lines of a bus, thereby providing a transmit path that is upstream from the transformer on the bus side. The transformer is thus bypassed when transmitting. As a result, the transmission power, which is high in comparison with the receiving power capacity, does not pass through the transformer. As a result the transformer can be designed in an especially compact and economical manner.

In one embodiment, one of the controllable switches of opposite polarity is an npn-transistor and the other a pnp-transistor. In another embodiment, one of the controllable switches of opposite polirayt is an N-channel FET and the other is a P-channel FET.

According to the illustrated embodiment of the present invention, the load-independent voltage source is a voltage divider having at least three resistors connected in serial. The load-independent voltage is maintained on the middle resistor. The voltage divider is coupled to the capacitor by at least one switch controlled by the transmission voltage signal. When a transmission signal is present, the controllable switches of opposite polarity are conductively controlled through the coupling via the middle resistor of the voltage divider. For the embodiment having a pnp-transistor, the control electrode is supplied with a positive transmission voltage for this purpose. During the breaks in transmission, the voltage source, when it is designed as a voltage divider, is disconnected from the transmission lines. In other words, it is disconnected from the positive, internal transmission line and from the negative, internal transmission line. During disconnection, zero volts are present on the middle resistor of the voltage divider so that it short-circuits the control electrodes of the switches of opposite polarity, whereby the transmission function becomes insensitive to interference effects of all kinds, i.e., to both asymmetrical and symmetrical interference effects.

As a result of the load-independent voltage on the control electrodes of the switches of opposite polarity, a load-independent current which is limited by an internal limiting resistor or by a discrete limiting resistor, flows through these switches. A voltage limitation of the transmission function follows via the voltage divider. The characteristics of a transformer are simulated in this manner, namely by limiting the voltage amplitude through its transmission ratio and by limiting the amplitude of the transmission current through its internal resistor. The current and voltage limitations of the transmission amplitude protect the transmission device from damage, especially in the case of a short-circuit on an external transmission line, for example, a bus. An initial pulse is further shaped by the complex load on the bus. The voltage divider can also operate with other than ohmic resistors. For example, the middle part of the voltage divider can also include a Zener-diode in addition to a resistor.

In the illustrated embodiment of the invention, the capacitor on the direct current power side of the transformer is a storage capacitor because of its size or composition, whereby a short-term failure of the power supply voltage can be bridged. At the same time, in connection with the capacitor, the winding on the side of the transformer that receives information forms a free-wheeling circuit dissipating the power absorbed in the winding during the reception. This power appears during the breaks in reception as a high, voltage spike which is of opposite polarity with regard to the received signal, on the ends of the winding. This power could possibly lead to interferences in the electronic network. To account for this, the illustrated embodiment of the invention provides a switch, such as a diode, that is serially coupled to the winding to pick off the receiving voltage between the winding and the switch.

BRIEF DESCRIPTION OF THE DRAWINGS

FIG. 1 is a schematic diagram of an embodiment of an information separation device constructed in accordance with an embodiment of the present invention.

FIG. 2 shows an alternative embodiment of switches of opposite polarity used in the circuit of FIG. 1.

DETAILED DESCRIPTION

An embodiment of an information separation device 1 according to the present invention shown in FIG. 1, has a transformer 2 that acts as a filter for separating the transmitted direct current power from the a.c. voltage information being signal. However, according to the invention, only the information that is received is transmitted via the transformer 2. The transformer 2 has at least two windings 3 and 4 on the transformer side which is connected to the direct current power. A capacitor 5 is serially arranged between these windings 3 and 4. This capacitor 5 acts as a conductor for information bearing signals received and represents a barrier for the direct current power. When the capacitor 5 has a suitable capacity, i.e., is designed as a storage capacitor, it can in the event of short, external voltage interruptions, buffer the dc voltage on the transmission lines 6 and 7 supplying the direct current power to the information separation device 1. For receiving direct current power and the alternating voltage information, the end of the coil 3 that is not coupled to the capacitor 5 is coupled to the transmission line 6. Likewise, the end of coil 4 not coupled to the capacitor 5 is coupled to the transmission line 7. The transformer 2 operates with a winding 8 on the side that outputs the received information.

A circuit 9, e.g., a push-pull circuit, with two controllable switches of opposite polarity has its output electrodes 12 and 13 coupled between the transmission lines 6 and 7. Control electrodes 14 and 15 of the circuit 9 are coupled to a load-independent voltage source 16 when a transmission signal is applied to the circuit. In this manner, a transmitter is provided that, with regard to the transformer 2, is enabled on the coupling side of the information separation device 1.

The information separation device 1 is coupled to a power source (not shown) via a bus line having bus conductors 17 and 18 in the embodiment of FIG. 1. For the transmit mode, the switch 21 e.g. a transistor controlled by a transmission voltage 22 is intercoupled into one of the connection lines 19 and 20. In the embodiment of FIG. 1, the transistor 21 is in the connection line 20, which extends between the capacitor 5 and the winding 4 on the side of the transformer coupled to direct current power. A positive transmission signal 22 is supplied to the transistor 21 via a transmission line 23.

During reception, a receiving line 24 is coupled to one end of the winding 8 on the transformer side that outputs the received information. A switch 25, a diode in the FIG. 1 embodiment, acts as a receiver. The receiving line 24 is connected to the junction between this diode 25 and the winding 8.

The controllable switches of opposite polarity 10 and 11 are, in the embodiment of FIG. 1, an npn-transistor for the switch 10 and a pnp-transistor for the switch 11. In the embodiment of FIG. 2, the switch 10 is an N-channel MOSFET and the switch 11 a P-channel MOSFET.

The load-independent voltage source 16, as illustrated in FIG. 1, is part of a voltage divider comprising at least three serially-connected resistors 26, 27 and 28 on whose middle resistor 27 the load-independent voltage is developed. The voltage divider is coupled to the capacitor 5 via the transistor 21 controlled by the transmission voltage. The voltage divider with the resistors 26, 27 and 28 can be switched on and off symmetrically on both sides by including a switch (not shown) upstream from the resistor 26. Using both this switch and switch 21 further promotes a performance response that is symmetrical and insensitive to interferences.

The information separation device 1 is supplied with positive dc voltage from bus conductor 17 and negative dc voltage from bus conductor 18. The bus conductors each supply symmetrical alternating voltage signals 29 and 30. The dc voltage is maintained at the ends of the transmission lines 6 and 7 in the information separation device 1. When there is a negative information bearing signal present on the transmission line 6 and a positive information bearing signal present on the transmission line 7, the alternating voltage of the information bearing signal received leads to a flow of current across the capacitor 5 and a transmitted voltage in the winding 8. The winding sense is illustrated by an asterisk so that in FIG. 1, in the case of a negative signal on the winding 3, a negative receiving signal 31 is present on the winding 8. At the end of the signal the magnetic lagging of the winding 8 leads to the generation of a relatively higher positive spike on the winding 8. This higher spike is sent to the free-wheeling circuit over the diode 25 and the capacitor 5.

When a positive transmission signal 22 is present on the transmission line 23, the switch 21 controlled by the transmission voltage becomes conductive so that the switch 11 also becomes conductive. Due to the coupling across the resistor 27, the switch 10 will also be conductively controlled. In FIG. 1 a limiting resistor 32 is serially coupled between the switches of opposite polarity 10 and 11 in order to limit the current. For reasons of symmetry, it is advantageous to arrange the limiting resistor 32 between the switch 10 and 11. Alternatively, the limiting resistor 32 can be included within the switches of opposite polarity 10 and 11.

In order to operate the switches of opposite polarity 10 and 11 by the load-independent voltage source 16, the load-independent voltage source 16 advantageously uses part of the voltage divider with the resistors 26, 27 and 28. In place of the middle resistor 27 or in connection with it, another suitable means of switching can also be used, for example a Zener-diode. Even when nothing is being transmitted, a fully symmetrical load appears between the transmission lines 6 and 7 when the switches 10 and 11 are closed. In this manner, no interfering signals can be transmitted on the bus conductors 17 and 18.

Due to the load-independent voltage source 16, the information separation device 1 according to the present invention operates With a load-independent current in the circuit 9 with the two switches of opposite polarity 10 and 11. This provides a transmit mode that is insensitive to interferences.

The illustrated embodiment of the information separation device 1 of the present invention uses a voltage divider for the load-independent voltage source 16, limits the voltage during transmit mode and limits the current through the limiting resistor 32, and simulates the performance characteristics of a typical transformer. When the amplitude of the transmission voltage and the transmission current is limited, the transmit mode becomes insensitive to interferences on the bus, especially to short-circuits on the bus. On the other hand, during the transmit mode, transmitting power bypasses the transformer 2 since the transmitting power is emitted between the transformer and the bus. The transformer can thus be designed in a compact and economical manner, and a bus-sided transmit mode attained.

What is claimed is:

1. An information separation device for receiving and transmitting a voltage information bearing signal, comprising:
   (a) a transformer functioning as a separating filter separating a received a.c. voltage information bearing signal from a direct current power, said transformer comprising:
       (1) a first side having at least a first and second winding, each having a first and second end;
       (2) a second side having a second winding outputting the received a.c. voltage information bearing signal;
       (3) a capacitor having a first terminal and a second terminal, said capacitor being coupled between the first end of the first winding and the second end of the second winding;
   (b) a first transmission line being coupled to the second end of the first winding, and carrying the direct current power and received a.c. voltage information bearing signal;
   (c) a second transmission line being coupled to the first end of the second winding, and carrying the direct current power and the a.c. voltage information bearing signal, whereby said capacitor transmits the a.c. voltage information bearing signal appearing on said first and second transmission lines;
   (d) a first controllable switch having an input electrode, a control electrode, and an output electrode being coupled to the first transmission line;
   (e) a second controllable switch of opposite polarity to the first controllable switch, having an input electrode being coupled to the input electrode of the first controllable switch, having a control electrode, and having an output electrode coupled to the second transmission line; and p1 (f) means for applying a load-independent voltage source across the control electrode of said first and second controllable switches when transmitting the a.c. information bearing signal.

2. The device according to claim 1, wherein said first controllable switch is an npn-transistor, and said second controllable switch is a pnp-transistor.

3. The device according to claim 1, wherein said first controllable switch is an N-channel FET and said second controllable switch is a P-channel FET.

4. The device according to claim 1, further comprising:
   a switch being controlled by a transmission voltage, and wherein said means for applying a load independent voltage comprises a voltage divider including:
   (a) a first and second terminal;
   (b) at least a first, second, and a third resistor connected in series, said switch being coupled between said first terminal of the voltage divider and said first terminal of the capacitor, and said second terminal of the voltage divider is coupled to the second terminal of the capacitor, whereby the load-independent voltage is developed across said second resistor.

5. The device according to claim 4, further comprising a limiting resistor being coupled between the input terminals of said first and second controllable switches.

6. The device according to claim 1, wherein the capacitor comprises a storage capacitor.

* * * * *